United States Patent [19]
Atkinson et al.

[11] 4,233,376
[45] Nov. 11, 1980

[54] MAGNESIUM-LITHIUM ALLOY

[75] Inventors: James T. N. Atkinson, Kingston; Maheswar Sahoo, Ottawa, both of Canada

[73] Assignee: Her Majesty the Queen in right of Canada, as represented by the Minister of National Defence, Ottawa, Canada

[21] Appl. No.: 8,690

[22] Filed: Jan. 30, 1979

[30] Foreign Application Priority Data

Feb. 14, 1978 [CA] Canada ................................. 297104

[51] Int. Cl.³ ............................................ H01M 6/04
[52] U.S. Cl. ................................. 429/199; 429/218
[58] Field of Search ................. 429/218, 199, 224; 75/168 B, 168 R, 147

[56] References Cited

U.S. PATENT DOCUMENTS

| | | | |
|---|---|---|---|
| 2,605,297 | 7/1952 | Dean | 75/168 B X |
| 2,622,049 | 12/1952 | Hesse | 75/168 R X |
| 2,742,357 | 4/1956 | Jackson | 75/168 B |
| 2,747,991 | 5/1956 | Hesse | 75/168 B |
| 4,130,500 | 12/1978 | Melendres | 75/168 B X |

Primary Examiner—Charles F. LeFevour
Attorney, Agent, or Firm—Cushman, Darby & Cushman

[57] ABSTRACT

The invention disclosed is a magnesium-based alloy for use in electrical batteries. The alloys contain 6–13%/w of lithium and exhibits enhanced electrochemical properties. Small amounts of aluminum may be added to the alloys to enhance corrosion resistance.

6 Claims, 13 Drawing Figures

MAGNESIUM-LITHIUM ALLOY

BACKGROUND OF THE INVENTION

This invention relates to magnesium-based alloys and in particular to magnesium-based alloy electrodes for use in batteries.

Magnesium has long been used as the anode in dry batteries in combination with a carbon-manganese dioxide cathode mix. An electrolyte used in one variety of these dry batteries comprises magnesium perchlorate, although alkali and alkaline earth bromides are often used. Small amounts of soluble chromates may be added to the electrolyte to reduce wasteful corrosion of the anode.

Alloys of magnesium have also been used in dry battery anodes. These include aluminum and zinc as alloying elements, the former having a beneficial effect on apparent current efficiency and the latter reducing the time lapse of delayed action i.e. the time lapse before the anode's protective film is disrupted and full operating voltage is achieved. Typical examples of these alloys include Mg Az31 and Az61, as designated by ASTM.

Since magnesium crystallizes in the hexagonal crystal system its usefulness is limited due to lack of cold rollability and cold-forming characteristics. These disadvantages also apply to the aforementioned magnesium-aluminum-zinc alloys.

It is known that magnesium-lithium alloys are partly or wholly crystallized in the cubic crystal system (depending upon the composition) characteristic of pure lithium, and hence are workable by straight forward metallurgical techniques. Thus, the addition of lithium to magnesium in sufficient quantities can change the crystal structure of the resultant alloy from hexagonal (magnesium) to cubic (lithium). These alloys are relatively soft and, for a Mg-base alloy, uniquely ductile. The cold forming troubles associated with the hexagonal crystal structure of magnesium and magnesium rich solid solutions may thus be avoided. In addition, lithium has a lower density i.e. 0.534 g/cc, than magnesium and hence, the addition of lithium to magnesium decreases the density of the resultant alloy making it lighter than pure magnesium.

According to the Mg-Li equilibrium phase diagram Freeth W. E. and Raynor, G. V., J. Inst. Metals 82 575–80 (1954), the solid $\alpha$ phase i.e. hexagonal crystal structure characteristic of pure magnesium exists up to about 5.7%/w lithium in the alloy.

Above about 10.3%/w lithium, the solid $\beta$ phase i.e. cubic crystal structure characteristic of pure lithium takes over. Between these limits a mixed solid solution ($\alpha$ and $\beta$) exists.

DESCRIPTION OF THE INVENTION

Applicant has now found that certain of these magnesium-lithium alloys show unusually favourable electrochemical characteristics. As mentioned above, magnesium-lithium alloys containing over about 10.3 %/w lithium exhibit the cubic crystal structure characteristic of lithium. These single phase ($\beta$) alloys are much more readily workable than other magnesium alloys and can therefore be fabricated at reasonable cost into an extensive range of anode configurations. In view of the high cost of lithium, for practical purposes, it was decided to limit the amount of lithium in the alloys without sacrificing the advantageous electrochemical properties i.e. high operating voltage and flat discharge curves. Accordingly, about 13%/w lithium was arbitrarily chosen as an upper limit. However, as will be apparent from the examples, in view of the consistently high voltages and flat discharge curves observed, there is every reason to believe that a substantially higher amount of lithium could be added if cost considerations are not a problem. With this in mind, the lower limit of the amount of lithium was reduced to about 6%/w without sacrificing the aforementioned electrochemical properties. As previously mentioned in this percentage range, the magnesium-lithium alloy exists as a mixed crystal structure ($\alpha$ and $\beta$). It was found by applicant that although the workability of these two phase alloys is more difficult than those of a purely ($\beta$) structure, they can be easily cold rolled into thin sheets by employing a few alternating cold rolling and annealing steps at a temperature of about 300° C. From a materials cost standpoint, the two phase ($\alpha$ and $\beta$) Mg-Li alloys are preferred. Since additional thermo-mechanical (i.e. annealing and rolling) processing steps are required, the cost savings due to the use of small amounts of lithium may off-set the additional cost of fabrication.

According to one aspect of the invention a magnesium-lithium alloy electrode is contemplated, the alloy consisting of 6 to 13%/w lithium 93.99 to 86.80%/w magnesium and 0.01 to 0.20%/w iron and other impurities.

In a preferred embodiment, a small amount of aluminum is included in the alloy in order to enhance its corrosion resistance, without sacrificing the advantageous electrical properties.

BRIEF DESCRIPTION OF THE DRAWINGS

In the drawings which serve to illustrate embodiments of the invention.

DETAILED DESCRIPTION OF THE DRAWINGS AND THE EXAMPLES

In the examples which follow, cell discharges are conducted with one anode of the magnesium alloy in question positioned between two manganese dioxide cathodes, and were conducted either into a constant external resistance, or at constant current drawn from a power supply. The manganese dioxide cathodes were prepared by cutting out current collectors 1½" wide by 2" high of expanded silver metal, with a tab being left attached to each for electrical connection.

A dry mix was prepared consisting of either 87 parts by weight of manganese dioxide of a commercial battery grade and 13 parts by weight 50% compression Shawinigan black; or 87%/w manganese dioxide, 10%/w Shawinigan black and 3%/w pulverized barium chromate. The purpose of the barium chromate is to protect the anode against corrosion during long storage of batteries; this is unnecessary in the tests conducted here, as the test cells were discharged shortly after preparation, but the addition was made to see if the 87-10-3 mix gave results different from the 87-13 mix. No difference was in fact observed. The procedure for preparing by mix follows commercial practice closely.

In cathode preparation, a known weight of dry-blended cathode mix was spread, and levelled on an expanded silver grid so that the grid was located centrally in the mix, and the composite encased in one layer of No. 1 Whatman filter paper, moistened with a small amount of the electrolyte to be described below, and compressed at a sufficient pressure to produce hard, compact cathodes that would withstand handling. It was completely enclosed in filter paper.

The electrolyte was 1.5 molar magnesium perchlorate in water, to which had been added 0.3%/w magnesium chromate.

The anode consisted of a sheet of the alloy in question, approximately 1¼" to 1 ⅜" wide by 2" high, to which had been spot-welded a wire at one corner for electrical contact. The spot weld was covered with silastic.

In most experiments, one anode and two cathodes were held together loosely, and the assembly placed in a small rectangular box and covered with electrolyte (about 30 ml). This provided a large excess of electrolyte over that normally used in commercial "dry" cells and relatively easy access of the electrolyte to the interior of the cell.

In a few experiments the anode and cathode were compressed in a jig held in a vise so that they were totally enclosed, a much smaller amount of electrolyte (several ml) being added beforehand, i.e. conditions more nearly comparable to the "starved" dry cell system.

The main finding was, that in all circumstances the Mg-Li alloys gave higher voltages than Mg Az31, and the voltage-time curves were flatter, i.e. there was less voltage "drop" during discharge.

Figure 1:
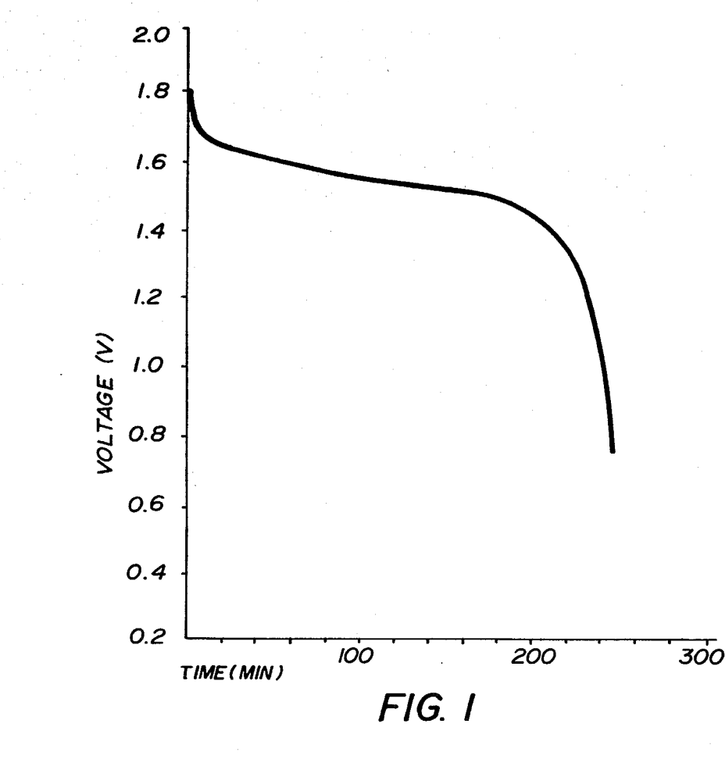
FIG. 1 is a graph of voltage vs time for a magnesium-aluminum-zinc alloy electrode.
Figure 2:
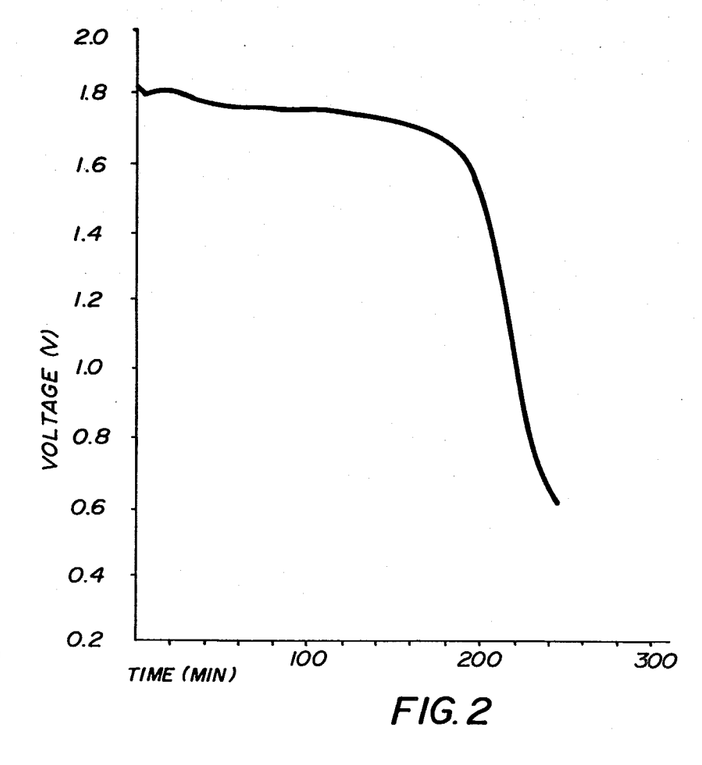
FIG. 2 is a graph of voltage vs time for a magnesium-lithium alloy electrode according to the invention.

A direct comparison of two discharges carried out under identical conditions, one with commercial Az31 alloy and one with one of the Mg-Li alloys is shown in FIGS. 1 (Az31) and 2 (Mg-Li, identified as I-1-3). The Mg-Li alloy voltage is higher by 0.15 to 0.20 volts during most of the discharge. Conditions in each case were: flooded cell (i.e. plentiful electrolyte), 5.73Ω external resistance, 4.0 grams dry mix per cathode.

Figure 3:
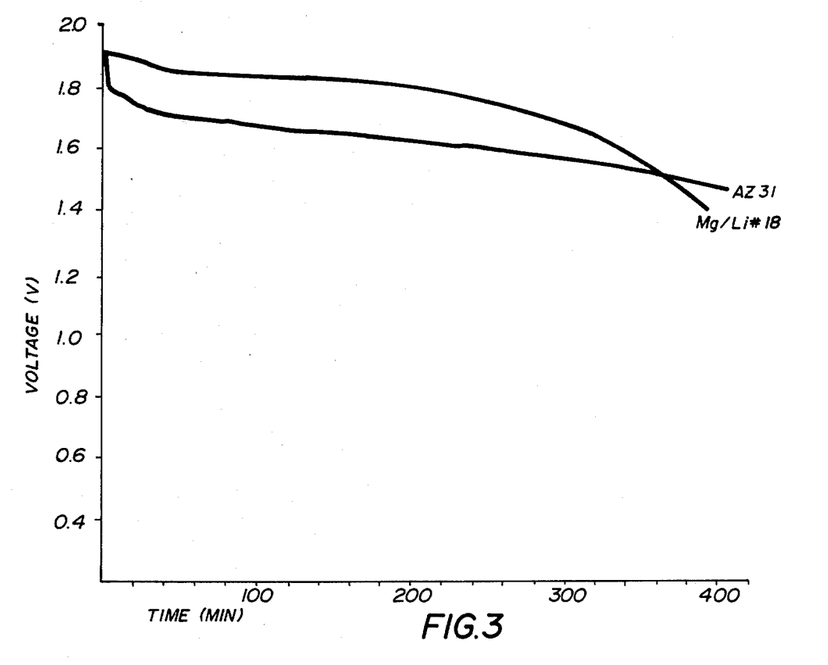
FIG. 3 is a graph illustrating a comparison of voltage vs time curves for a Mg-Al-zn alloy electrode and a Mg-Li alloy electrode according to the invention.

A similar comparison of discharges made this time under "starved" conditions appeared in FIG. 3, this time employing Az31 and a Mg-Li alloy identified as No. 18, with 6.7 grams of dry mix per cathode. External resistance was 5.73Ω as before. A similar improvement in voltage is observed.

It should be noted that a voltage of say 1.6 volts, and an external resistance of 5.73Ω corresponds to a current of 280 mA, or for both sides of a 1¼"×2" anode, a current density at the anode of 56 mA/in$^2$ or converting to cm$^2$, 8.7 mA/cm$^2$.

Figure 4:
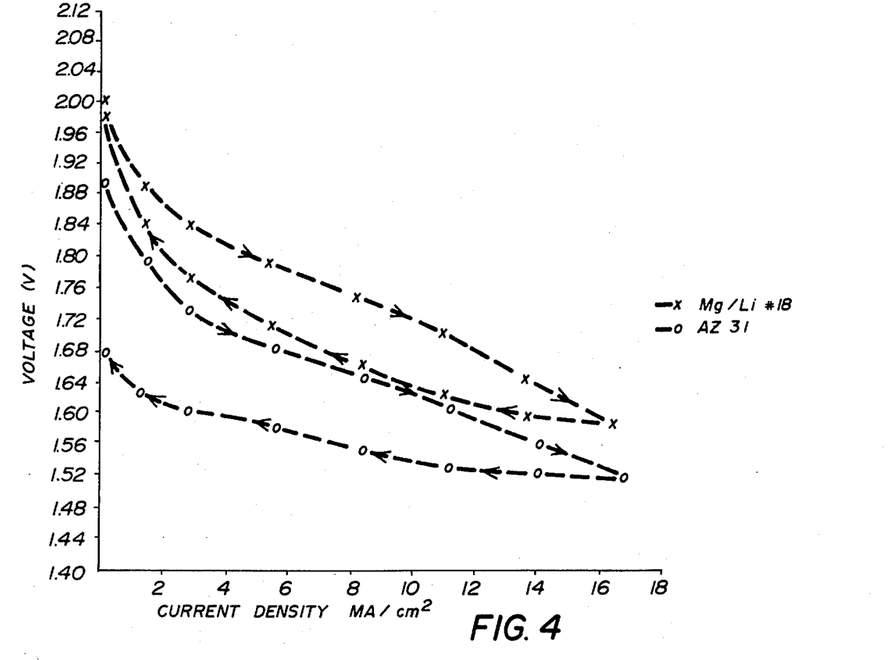
FIG. 4 is a graph illustrating the effect of varying current density for a Mg-Al-zn alloy electrode and a Mg-Li electrode according to the invention.
Figure 5:
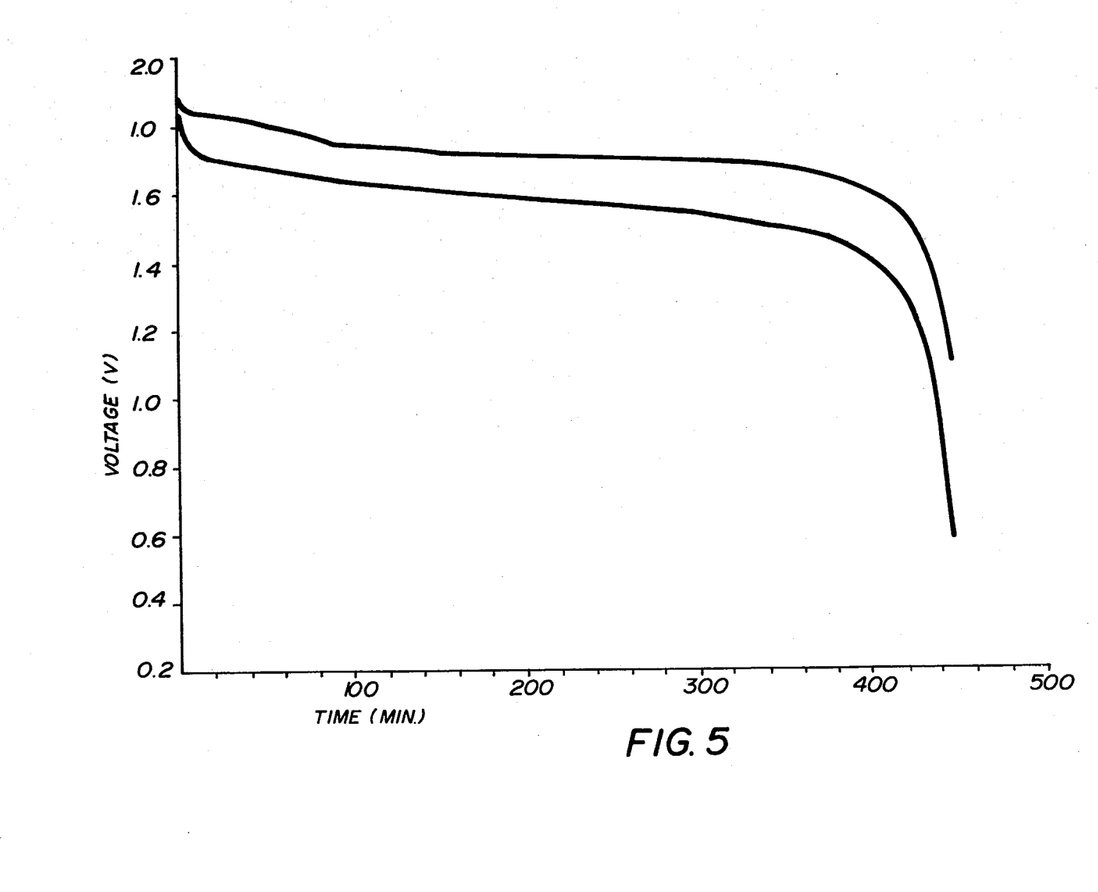
FIGS. 5 to 8 illustrate a comparison of a typical Mg-Al-zn alloy electrode and a Mg-Li alloy electrode according to the invention under discharges of 150, 250, 350 and 450 mA, respectively.
Figure 6:
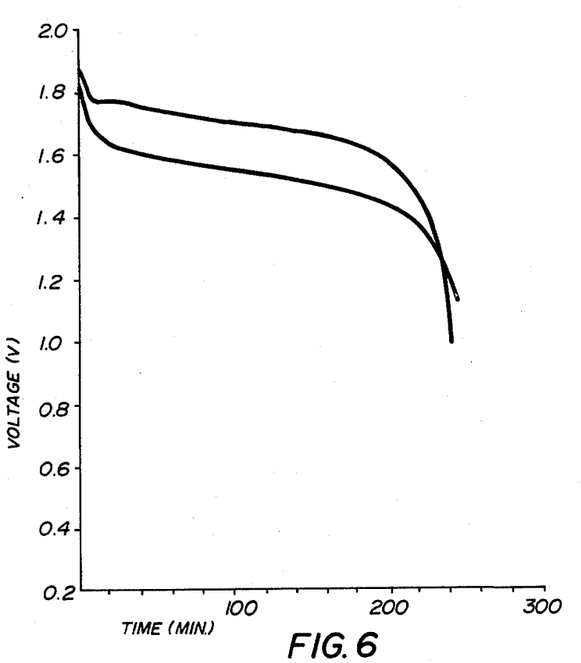
Figure 7:
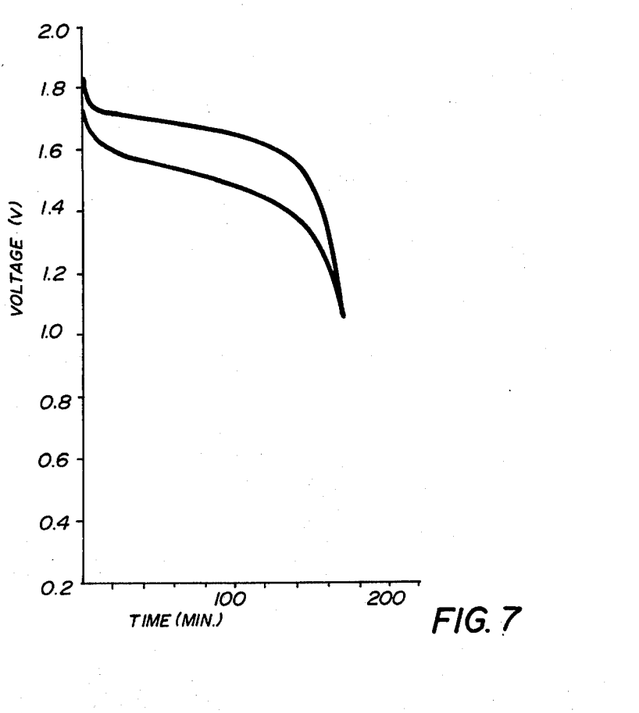
Figure 8:
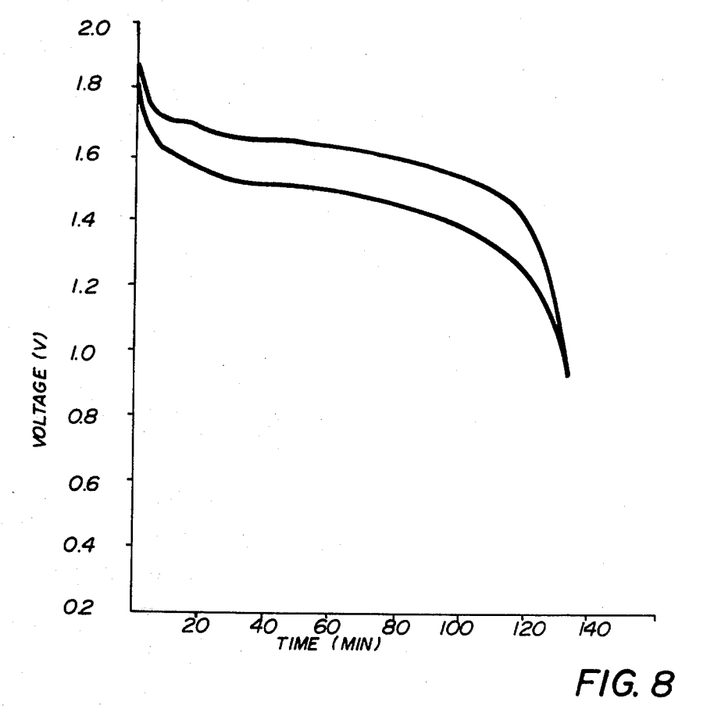

In another experiment (FIG. 4) the effect of varying current density on the two alloys (Az31 and Mg-Li No. 18) was tried, by discharging two cells, identical to those of FIG. 3 from a power supply. Beginning with the cells on open circuit, the current was stepped up successively to a maximum corresponding to 16 to 17 mA/cm$^2$, and returned by similar stages to open circuit (O.C.) (zero current density). The cell was run at each current setting for a uniform seven minutes before taking the voltage reading. The voltage advantage of the Mg-Li No. 18 over the Az31 is again seen. It is observed that there is a hysteresis loop in each case, larger for Az31 than for the Mg-Li alloy, and also that while the Mg-Li nearly regains its original o.c. voltage at the end of the cycle, the Az31 final o.c. voltage is about 0.2 volts lower than the starting o.c. voltage.

FIGS. 5 to 8 illustrate further the comparison of Az31 and a Mg-Li alloy (No. 17), by a series of pairs of discharges at constant currents of 150, 250, 350 and 450 mA.

Figure 9:
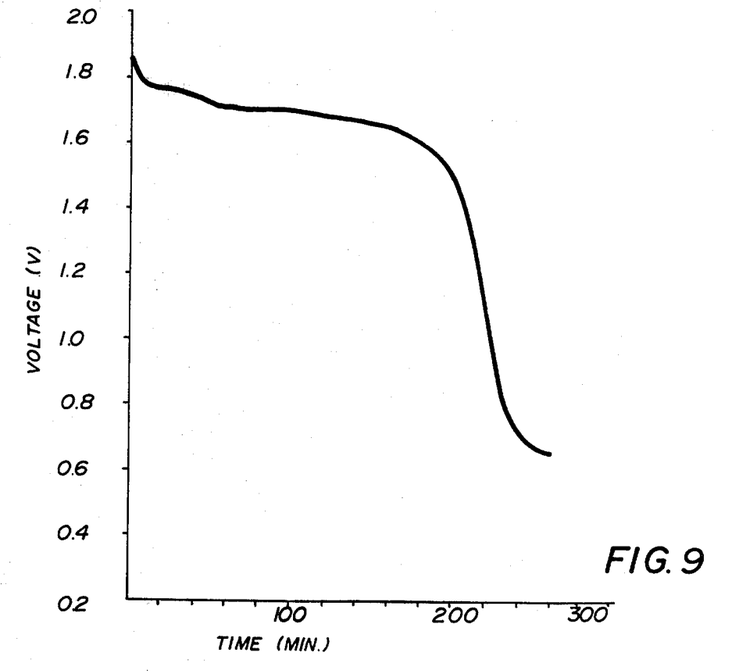
FIG. 9, illustrates the performance under discharge of a Mg-Li alloy ($\alpha$ and $\beta$) phase electrode according to the invention.

So far, only single-phase Mg-Li alloys i.e. alloys containing more than about 10.3 weight % Li have been described. For comparison FIG. 9 depicts the performance under discharge of an ($\alpha$ and $\beta$) alloy, identified as 13(A)1, which may be compared with FIGS. 1 and 2, to show the same voltage advantage of 2-phase Mg-Li alloys over Az31.

Figure 10:
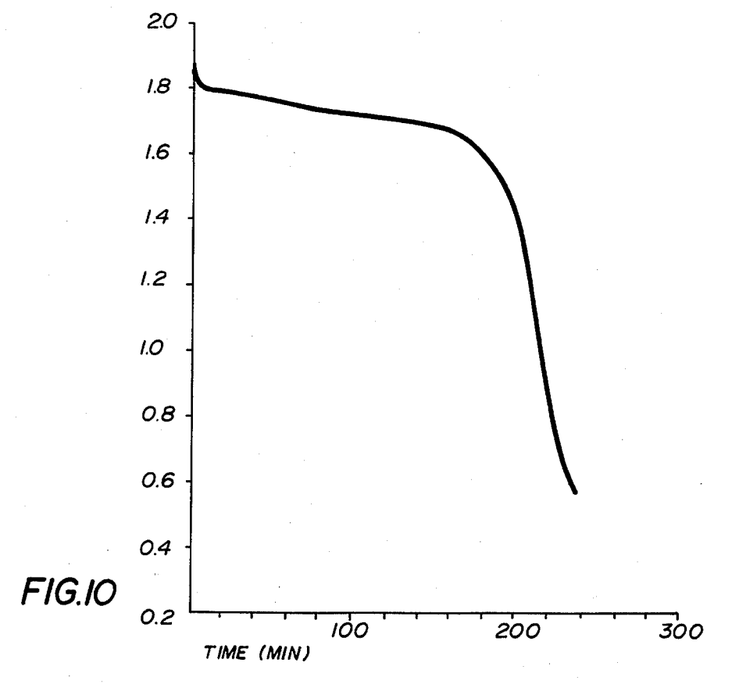
FIGS. 10 and 11, are presented for comparison purposes to illustrate the effect of the different methods of preparation of typical Mg-Li alloy electrodes according to the invention.
Figure 11:
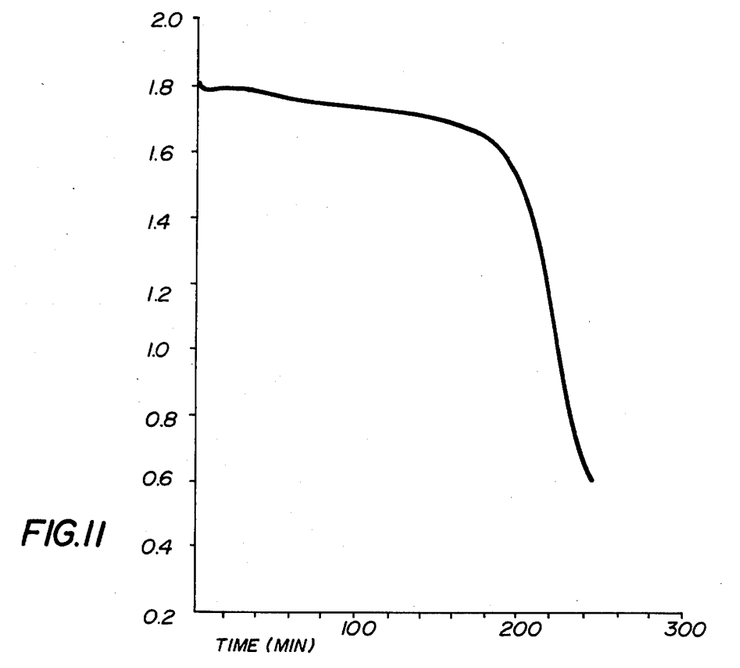

FIGS. 10 and 11 are presented, for comparison with FIG. 2. These show respectively the performance of Mg-Li No. 18, Mg-Li No. 22 and Mg-Li I-1-3 under identical conditions, and demonstrate that three methods of preparation differing in some details (to be given below) all result in Mg-Li alloys with similar discharge properties and similar improvement over Az31.

The various alloys discussed above were prepared as follows.

The Mg and Li used to prepare the alloys had the following analysis:

| | | |
|---|---|---|
| Mg → | 99.95% Mg | |
| | Ni, Fe, Cu 0.005% | |
| | Si ≦ 0.01% | |
| | Ni ≦ 0.01% | |
| | Mn 0.01% | |
| | Cu 0.002% | |
| | Na, K approx. 10 ppm | |

| | Element | Maximum | Minimum |
|---|---|---|---|
| Li → | Li | 99.9% | 99.8% |
| | Na | 0.02% | 0.05% |
| | K | 0.01% | 0.05% |

EXAMPLE 1

The Mg-Li alloy (No. 17) (12.2%/w Li) was formed in a crucible in the form of a thin wall 1¼ in$^2$ steel tube closed at one end, in a resistance-heated furnace. Lithium is cleaned i.e. a contaminated layer caused by reaction of lithium with atmospheric oxygen and nitrogen is removed by immersing in a solution of xylene or toluene containing 5% methanol. The cleaned lithium is added to the steel crucible, followed by a stirrer. One inch diameter magnesium rods were either cut into two halves, cleaned in dilute HCl and supported on the stirrer, or were centrally drilled with a 5/16 inch bit, cleaned and inserted over the stirring rod into the crucible. The metals are then melted under an argon atmosphere, the furnace temperature being maintained at about 850° C. Li melted first and after 12 mins. the stirrer was pushed down so that it was just inside the molten Li pool. The flat steel plate of the stirrer prevented the Mg from going down. Solid Mg gradually alloyed with molten Li and at the same time melted as the temperature inside the crucible was increased to more than the melting point of Mg. The heavier liquid went down slowly to alloy with molten Li. After another 40 mins. the stirrer was pushed and pulled a number of times to make sure that all the Mg melted and alloyed with Li. The stirrer was then pulled upwards so that it was about 4 cm. away from the top of the molten pool. The melt was allowed to cool inside the furnace and subsequently annealed in-situ at 300° C. for 6 hrs.

After annealing the steel plates and walls of the crucible were removed in a band saw and the alloy was cut into two halves along its length. The shrinkage cavity was about 5–8 cm long. However, each face of the bar was milled prior to rolling. After milling, the thickness of each bar was about 0.2 to 0.4 inches. Cold rolling was effected to 90% reduction and then annealed at 158° C. for 1 hour. Fine equiaxed grains were observed in the resulting alloy. The density of the alloy was measured at each end of the bar before and after rolling. The data are summarized in Table I which indicate that uniformity in composition has been achieved.

EXAMPLE 2

The Mg-Li alloy (No. 18) (12.3%/w Li) was formed and worked following the same procedure as in example 1. The relevant data are summarized in table I.

EXAMPLE 3

The Mg-Li alloy (No. 22) (12.2%/w Li) was formed following the same procedure as in example 1. The resulting alloy was worked i.e. cold rolled to 90% reduction and annealed at 60° C. for 1 hour. The working left the cold rolled structure unmodified. The relevant data appear in Table I.

EXAMPLE 4

The Mg-Li alloy (I-1) (12.2%/w Li) was formed by heating the alloying elements in an induction furnace and then cast into a steel mold.

The Balzers high vacuum melting and casting induction furnace was then used to melt the Mg-Li alloys under an argon atmosphere. For this purpose a mild steel crucible, 20 cm long and 10 cm in O.D., closed at one end by welding a ⅜ in. steel plate was used. The mild steel crucible was fitted into the induction coil. The crucible was insulated from the coil by a thin layer of mica. The surface between the crucible and the mica lining was packed with fine ramming refractory powder and tamped in. The tamping was done by a 4 mm steel rod. In order to prevent the refractory powder from falling down during pouring, a kyanex clay lining was put to about 2 cm below the rim of the crucible. The clay lining was allowed to dry at room temperature for about 48 hrs. The crucible assembly was then cleaned, made dust-free and then connected to the induction furnace and dried at 500°–600° C. to drive off moisture. After cooling, the crucible was cleaned with a vacuum cleaner and the furnace was pumped down for 2 days.

Li rods, cut into small pieces were cleaned and quickly transferred to the crucible. Mg rods, 18 cm long, were cleaned and put on top of Li pieces. The furnace lid was closed and the furnace was pumped down and flushed with argon. Melting was done at an argon pressure of 450 mm of Hg. Very low power was supplied to melt Li first. The power was then increased to melt Mg. The latter stage of melting could be seen through the viewing window of the furnace. The molten alloy was then cast into a cold steel mold, still under argon, to get a casting of 24×13×2.8 cm.

After cooling the atmosphere was released and the casting was removed from the induction furnace; its density was measured at a number of points. After cold rolling to 90% reduction, annealing was effected at 160° C. for 1 hour. These data are included in Table I and show the uniformity in composition obtained in this method of alloy preparation.

TABLE I

Chemical Analysis and Density Data for Mg—Li Alloys Melted in Both the Resistance and Induction Furnace

| Alloy No. | Method of Preparation | Wt. % Li | Wt. % Fe | density, gm/cc As Cast and Compressed | Cold Rolled | Cold Rolled and Annealed |
|---|---|---|---|---|---|---|
| 17 | Resistance Furnace | 12.2 | 0.0054 0.0085 .0127 | 1.451 1.442 | 1.443 (90% CW) | 90% CW & Ann. 158° C., 1 hr. |
| 18 | Resistance furnace | 12.3 | .0094 .0093 .0098 .0093 | 1.444 1.442 | | 1.434 (90% CW & Ann. 158° C., 1 hr.) |
| 22 | Resistance furnace | 12.2 | 0.007 | 1.449 1.444 | 1.439 (90% CW) | 1.436 (90% CW & Ann. 60° C., 1 hr.) |
| I-1 | Induction furnace | 12.2 | 0.1016 0.1070 0.0992 | 1.454 1.454 1.456 1.455 1.452 | 1.452 (90% CW) | 1.450 (annealed 160° C., 1 hr.) |
| 13A(1) | Resistance furnace | 8.5 | 0.03 | | | |

EXAMPLE 5

The Mg-Li alloy (13(A)1) (8.5%/w Li) i.e. (α and β) phase non-uniform in composition was prepared as in example 1.

The resulting alloy was cold rolled 36%, then annealed in air at 300° C. for 1 hour. A second cold rolling to 68% was then effected, followed by air annealing at 300° C. for 20 minutes. A third cold rolling to 88% was then effected with subsequent annealing at 300° C. for 5 minutes. A final cold rolling to 0.027" i.e. 95% was then effected.

Accordingly, a typical (α and β) phase alloy (example 5) requires several alternating cold rolling and annealing steps to effect reduction of the order of 90%. It will be appreciated that in the alloys of examples 1–4, the final heat treatments are inessential. Specifically, the final heat treatment at about 160° C. of Examples 1 (alloy 17) and 2 (alloy 18) are optional and carried out to get metllurgical or metallographic information, and are not necessary to produce a useable alloy. Thus, in Example 3 an alloy (22) similar to 18 (Example 2) is made, but is annealed at only 60° C., which leaves the cold rolled structures unmodified. Nevertheless, discharge properties of alloys 18 and 22, depicted in FIGS. 10 and 11, are seen to be closely similar.

The results in Table II show that the three-component systems of examples 6 and 7 containing Mg-Li-Al displayed superior corrosion resistance.

TABLE II

| SAMPLE | CRUCIBLE | COMP-[1] OSITION | % COLD WORK | CONDITION ANNEALING TREATMENT | CORROSION RATE MDD[2] | VISUAL OBSERVATION |
|---|---|---|---|---|---|---|
| I-7 | low carbon steel | 12% Li 1.5% Al | 70 70 | 250° C. 1 hour 300° C. 1 hour | 9.0 3.8 | Very good |
| I-30 | silicon carbide | 9.5% Li 0.5% Al | 80 80 | 250° C. 1 hour 300° C. 1 hour | 6.8 4.0 | Good |

NOTES:
[1] balance is magnesium
[2] MDD = milligrams per square decimeter per day

EXAMPLE 6

Magnesium-9.5% w/w lithium-0.5% w/w Aluminum melted induction furnace in silicon carbide crucible under argon and cast in a lined steel mold. Subsequent treatment is as follows:

To prepare the alloy for rolling it was homogenized for 5 hours at 300° C. and then scarfed by milling to a thickness of 21 mm (0.832"). It was then cold rolled 52% to a thickness of 10 mm (0.400") followed by annealing for 3 hours at 300° C. The alloy was then rolled 44% in the hot condition to a thickness of 5.7 mm (0.225"). At this stage a few edge and surface cracks appeared. The alloy was annealed for 20 minutes at 300° C. and then rolled in the hot condition 46% to a thickness of 3 mm (0.121"). The alloy was then annealed for the last time for 20 minutes at 300° C. and rolled in the hot condition folled by cold rolling to a thickness of 1 mm (0.031"). This corresponds to about 80% cold working. This combination of cold and hot rolling with intermediate annealing produced a good quality, smooth surface on the finished thin sheet.

Figure 12:
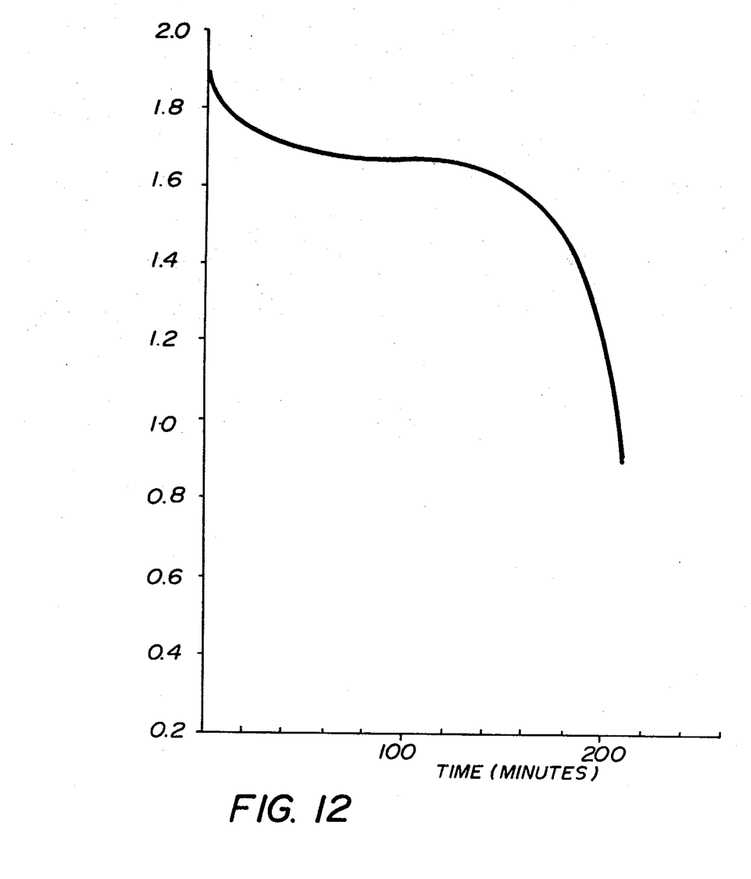
FIGS. 12 and 13 illustrate voltage vs time curves for alloys according to the invention which include aluminum.

The material used in cell testing was subsequently annealed at 300° C. for one hour. This is another illustration of the more extensive cold-working that is required by 2-phase alloys compared to 1-phase alloys. Discharges were conducted as in FIGS. 10 and 11 - i.e. 5.73Ω, room temperature, 1.5 M magnesium perchlorate plus 0.3% magnesium chromate. It is apparent from FIG. 12, that the advantageous electrochemical properties have not been sacrificed by the addition of aluminum.

EXAMPLE 7

Magnesium - 12% w/w lithium - 1.5% w/w aluminum melted in induction furnace in steel crucible and cast in a lined steel mold. Cold rolled 70% and annealed at 300° C. for 150 minutes.

Cell discharge was conducted in exactly the same way as I-30.

Figure 13:
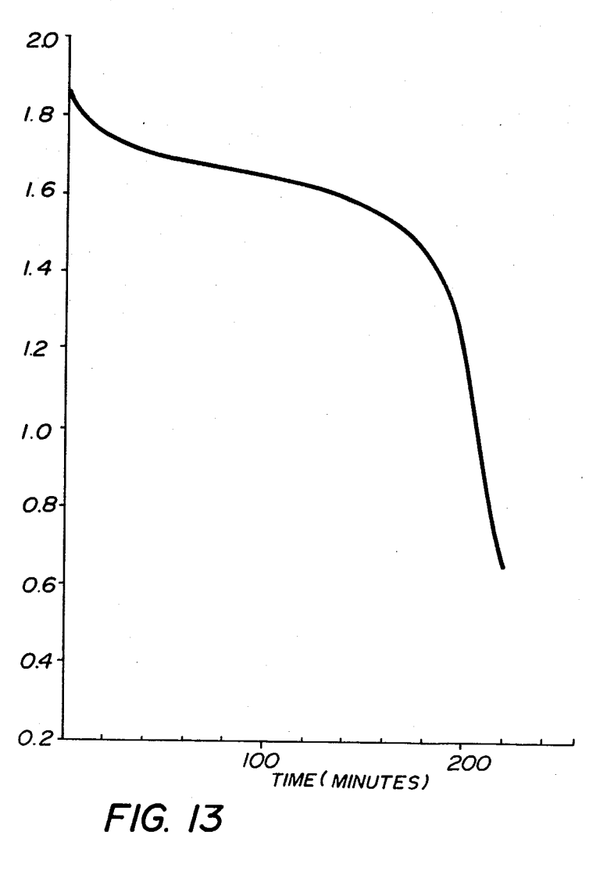

It is again apparent, this time from FIG. 13, that the advantageous electrochemical properties have been maintained.

Studies have been carried out of the corrosion of some of these alloy specimens on storage. The weighed specimens were immersed in 1.5 Molar magnesium perchlorate containing 0.2% magnesium chromate, (i.e. close to the composition used in cell discharge studies), and left for varying periods of time at room temperature. At the end of the test they were washed in water, then immersed in 20% chromic acid containing 1% silver nitrate for 3 minutes, to dissolve off corrosion products. They were then dried and reweighed, and the weight losses expressed as milligrams per square decimeter per day, in accordance with standard practice. Visual observations were also made on the etched or corroded surface.

Of the impurities present in the final alloys, only iron is thought to present any problem. The presence of iron tends to accelerate corrosion of the magnesium-based alloys in aqueous solution. This was not a problem in the present experiments, since they were conducted without prolonged exposure to the corrosive environment. In any case, the amount of iron in the final alloy can be effectively minimised by employing substantially iron-free crucibles e.g. silicon carbide as in example 6. When using this type of crucible the iron content is virtually the same amount as present in the starting materials.

It will be apparent to those skilled in the art that while the invention has been described in conjunction with specific embodiments thereof, it is evident that many alternatives, modifications and variations are possible without departing from the central characteristics thereof. Accordingly, it is intended to embrace all such alternatives, modifications and variations within the spirit and scope of the appended claims.

The embodiments of the invention in which an exclusive property or privilege is claimed are defined as follows:

1. An electrical battery comprising an anode, a manganese dioxide cathode and an aqueous magnesium perchlorate electrolyte, wherein the anode is made of a magnesium-based alloy, the alloy consisting essentially of 6–13%/w of lithium, 0–1.5%/w of aluminum, the balance being magnesium and impurities.

2. In an electrical battery comprising a magnesium-containing anode, an aqueous magnesium perchlorate electrolyte and a magnesium dioxide-containing cathode,
   the improvement wherein said anode is a magnesium-based anode alloy consisting essentially of from about 6 to about 12% by weight of lithium, up to 1.5% by weight of aluminum, the balance being magnesium, said battery exhibiting a high operating voltage and a substantially flat discharge curve.

3. The electrical battery according to claim 2, wherein said anode consists of from about 86.8 to about 93.99% by weight of magnesium, from about 6 to about 13% by weight of lithium, up to 0.2% by weight of aluminum and impurities in the range of about 0.01 to about 0.20% by weight.

4. The electrical battery according to claim 1 or 2, wherein the anode contains about 9.5% by weight of lithium and about 0.5% by weight of aluminum.

5. The electrical battery according to claim 1 or 2, wherein the anode contains about 12% by weight of lithium and about 1.5% by weight of aluminum.

6. The electrical battery according to claim 6 wherein said anode consists of, weight percent:
   magnesium: 93.99 to 86.80%
   lithium: 6 to 13%
   aluminum: up to 1.0%
   and other impurities: 0.01 to 0.20%

* * * * *